United States Patent [19]

Bebout

[11] E Re. 31,130

Best Available Copy [45] Reissued Jan. 25, 1983

[54] WOOD TURNING PROCESS AND APPARATUS FOR MAKING CYLINDROCONICAL WOOD PRODUCTS

[75] Inventor: Robert W. Bebout, Spring Hill, Fla.

[73] Assignee: John Totten, Orlando, Fla.

[21] Appl. No.: 135,379

[22] Filed: Mar. 28, 1980

Related U.S. Patent Documents

Reissue of:

[64] Patent No.: 4,082,126
Issued: Apr. 4, 1978
Appl. No.: 788,270
Filed: Apr. 18, 1977

[51] Int. Cl.[3] ..... B23B 1/00; B23B 5/26

[52] U.S. Cl. ..... 142/1; 142/42; 142/49; 144/33; 144/354; 82/1 C; 82/17

[58] Field of Search ..... 142/1, 21, 35, 36, 38, 142/42, 43, 46, 47, 49; 144/33, 314 B; 82/1 C, 17, 25, 36 R

[56] References Cited

U.S. PATENT DOCUMENTS

| | | | |
|---|---|---|---|
| 210,229 | 11/1878 | White | 144/323 |
| 214,672 | 4/1879 | Lockwood | 142/49 |
| 476,696 | 6/1892 | Stoner et al. | 142/42 |
| 923,757 | 6/1909 | Bean | 82/36 R |
| 3,645,309 | 2/1972 | Canfield | 144/33 |

FOREIGN PATENT DOCUMENTS

| | | | |
|---|---|---|---|
| 8404 | of 1911 | United Kingdom | 144/314 B |

*Primary Examiner*—Leonidas Vlachos
*Attorney, Agent, or Firm*—Duckworth, Allen, Dyer & Pettis

[57] ABSTRACT

A process for manufacturing a plurality of concentric, cylindriconical, annular rings from plywood or other wood material for use in constructing cylindriconical wood products.

13 Claims, 8 Drawing Figures

WOOD TURNING PROCESS AND APPARATUS FOR MAKING CYLINDROCONICAL WOOD PRODUCTS

Matter enclosed in heavy brackets [ ] appears in the original patent but forms no part of this reissue specification; matter printed in italics indicates the additions made by reissue.

BACKGROUND OF THE INVENTION

1. Field of the Invention

The process of this invention is associated with the field of wood-turning technology, specifically as related to the manufacture of wood products comprised in part of cylindroconical rings turned from plywood. More specifically, the procedure of this invention provides an expeditious means for manufacturing strong cylindroconical rings from plywood in a manner which minimizes waste of material.

2. Description of the Prior Art

Techniques commonly used for manufacturing cylindrical wood receptacles and other products include use of stave-type construction and the use of lathes to turn such products from wood logs. The use of stave-type construction limits the shape of the product to maximum curvatures obtainable by bending and shaping staves. Construction from wood logs or blocks requires extensive lathe time and causes excessive waste of materials.

The use of stacked rings of varying diameters is an alternative to use of stave-type or lathe-type construction described above. However, heretofor such rings were usually cut from wood sheets by using a band saw, saber saw or hole cutter. The use of a band saw or saber saw requires a wide and uneven saw cut which must be started by drilling or cutting material adjacent to the ring being manufactured, thus spoiling said adjacent material for later use. The use of a hole cutter limits manufacture to non-conical rings only.

Therefore, it is an object of this invention to achieve an economical and effective wood-turning process for use in manufacturing strong, concentric, cylindroconical rings which may stacked and glued to form wood products having a wide variety of annular configurations.

SUMMARY OF THE INVENTION

In achieving the object of an economical wood-turning process for making annular wood products from a sheet of wood material such as plywood, a cutting tool is used to cut a generally round piece of said wood material into a plurality of concentric, cylindroconical, annular rings. The conical angle and the thickness of said rings are chosen such that said rings may be stacked and adhered to one another to form a hollow wood product of cylindroconical shape. Additional pieces of plywood may be cut and assembled in similar manner to combine with the previously cut rings to form a wood product with a multiplicity of cylindroconical angles.

DETAILED DESCRIPTION

Figure 1:
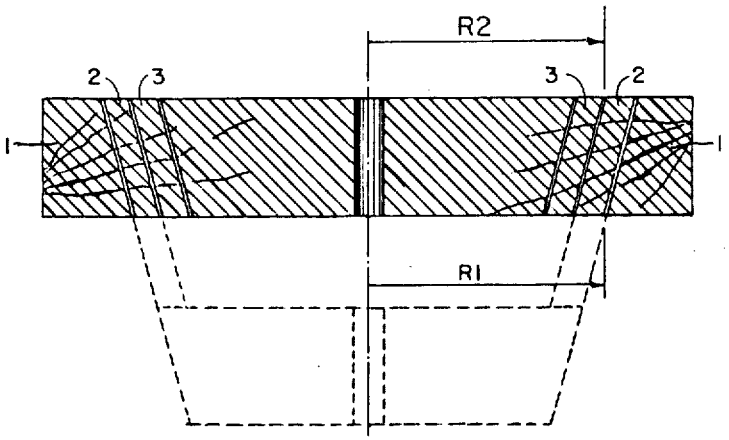
FIG. 1 is a cross-sectional view showing critical dimensions for cutting conically-shaped rings and showing stacking of the rings.

FIG. 1 depicts a cross-sectional view of a diameter of a generally round piece of processed lumber or similar wood material 1, preferably marine plywood of three-fourths inch thickness. The procedure of this invention generally requires that lower outer radius R1 of cylindroconical ring 2 be substantially equal to upper outer radius R2 of adjacent cylindroconical ring 3. For a given thickness of material 1 and given width of cutting blade, the conical angle and ring thickness are adjusted to result in proper radial distances. For example, I have found that, by using three-quarter inch plywood and a blade thickness of approximately one-twentieth inch, a conical angle in the range of 25° results in ring thickness of one-fourth to five-sixteenths inch.

It is possible, using the process of this invention, to manufacture up to 72 8-inch-diameter, 5-inch-heighth products from one 4-foot by 8-foot sheet of ¾ inch plywood. The resulting products have great strength, form and beauty.

The processed lumber or other similar material 1 may be cut into generally round discs of wood material 1 through use of a saber saw or other cutting instrument. Use of a generally round disc rather than a generally square piece of material 1 for starting the process is recommended for the purpose of safety and reduced machine size, as will be apparent from further discussion of the procedure of this invention.

Figure 2:
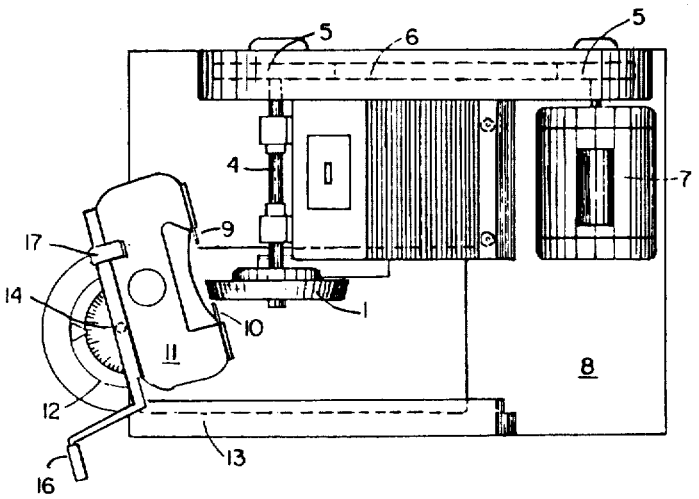
FIG. 2 is a side view of a wood-turning machine used in the process of this invention.
Figure 3:
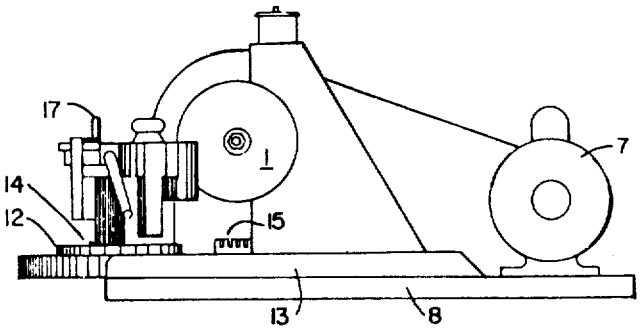
FIG. 3 is a top view of a wood-turning machine used in the process of this invention.

FIGS. 2 and 3 depict a wood-turning machine for use with the process of this invention. The Figures indicate a 8-inch-diameter piece of processed lumber material 1 mounted on a rotatable shaft 4. The 8-inch-diameter disc is turned at from 800 to 1000 revolutions per minute by a drive means which may be comprised of pulleys 5, belt 6 and motor 7. I have found that, in order to prevent excessive heat from being generated during cutting operation, the maximum circumferential speed of the disc should be less than 26,000 inches per minute. Rotatable shaft 4 and said drive means are mounted on frame means 8.

Two cutting bits, 9 and 10, are directed toward each other and positioned such that the tooth ends of said bits are displaced from each other a distance greater than one and one-half times the thickness of wood-material 1. Said cutting bits are mounted in a bit-holding-guide means 11 which may be comprised of a generally U-shaped block with said bits directed toward each other from the inner sides of said U-shaped block.

Bit-holding-guide means 11 is slidably mounted on swivel means 12. Swivel means 12 is rotatably mounted on a table guide means 13. Table guide means 13 is slidably mounted on frame means 8.

The process of the invention requires setting the cylindroconical angle of the ring or rings to be cut by rotating swivel means 12 to adjust the angle between bits 9 and 10 and wood material 1. Once the angle is set, first locking means 14 is activated to prevent further rotation of swivel means 12 with respect to table guide means 13. The cylindroconical angle is always chosen to have pointed and away from shaft 4.

Table guide means is then slidably adjusted along a path such that bits 9 and 10 move parallel to a radius of wood material 1 until positioned to cut the largest diameter cut to be made on wood material 1. Second locking means 15 is activated to prevent movement of table guide means 13 with respect to frame means 8.

Shaft 4 is caused to rotate by activating said drive means. Bit-moving means 16, which may constitute a worm gear or threaded screw mechanism, is activated to cause bit-holding guide means 11 to move non-shaft-side bit 10 in the direction of point of said bit until said bit has cut a channel to a depth approximately equal to one-half the thickness of wood material 1.

Bit-moving-means 16 is then disengaged from either bit-holding-guide means 11 or swivel means 12 by activating release means 17. Bit-holding-guide-means 11 is quickly moved to it starting position with bits 9 and 10 out of contact with wood material 1. Prolonged contact between the bit and rotating wood material causes overheating of the bit.

Release means 17 is then re-connected to either bit-holding-guide means 11 or swivel means 12, preferably at a new location chosen to eliminate the need to return bit-moving means 16 to its original position.

Bit-moving-means 16 is then activated to cause shaft side bit 9 to move in the direction of point of said bit until said bit has cut a channel through wood material 1 to a depth sufficient to connect with the channel previously cut.

Release means 17 is then activated and bit-holding-guide means 11 is returned to a position such that bits 9 and 10 are not in contact with wood material 1. Rotation of wood material 1 may be ceased and the cut material removed from the apparatus.

Assuming that the outer cylindroconical angle of the next ring is the same as that of the first, second locking means 15 is de-activated and table guide means 13 is moved to a second location, which is usually chosen such that the next ring will stack with the first ring to form a continuous cylindroconical angle. I use for my second locking means 15 a variety of removable templates attached to frame means 8. Each template has a series of locking notches spaced to correspond to the proper ring width for a given angle of cylindroconical cut. Table guide means 13 is provided with a simple protruding member which is placed in each locking notch as subsequent smaller diameter rings are cut.

The cutting process described above is repeated until the desired number of cylindroconical rings have been cut from wood material 1. It is, of course, unnecessary to cause the rotatable shaft 4 to cease rotation between the cutting of rings. For construction of spherical and similar-type wood products, it is necessary to change the cylindroconical angle between the cutting of each ring.

The central part of wood material 1 may be used as the top or bottom surface of the wood product constructed by stacking cylindroconical rings. Construction of the wood product is accomplished by use of glue or other adhering substance to attach the stacked rings to form the desired shaped product. For added strength and beauty, I attached the wood product to the end of the rotatable shaft 4 and applied clear resin coating to the inside of the rotating material. The result is a strengthened container with translucent areas in the region of cross-cut wood fibers.

Figure 4A:
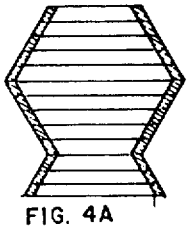
FIG. 4A is a cross-sectional view of wood receptacles of the type which may be manufactured using the process of this invention.
Figure 4B:
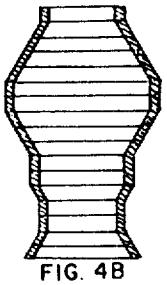
FIG. 4B is an alternate cross-sectional view of wood receptacles of the type which may be manufactured using the process of this invention.
Figure 4C:
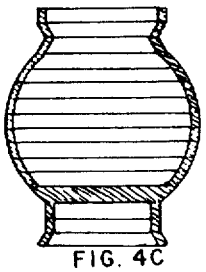
FIG. 4C is still another alternate cross-sectional view of wood receptacles of the type which may be manufactured using the process of this invention.

It is obvious that a wide variety of the wood products may be made using cylindroconical rings cut with a variety of cylindroconical angles from a multiple number of discs of wood material 1. Examples are indicated in FIGS. 4A, 4B, and 4C.

Figure 5:
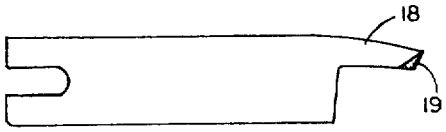
FIG. 5 is a side view of a cutting blade used in the process of this invention.
Figure 6:
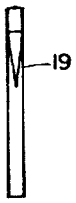
FIG. 6 is an end view of the cutting blade used in the process of this invention.

Bits 9 and 10 are preferably formed as indicated in FIGS. 5 and 6. FIG. 5 indicates a side view of one of the bits showing a pointed tip 18. Tip 18 is shaped with beveled edges 19 as shown in FIG. 20. The particular shape results in a cut of minumum width and in operation with no binding between blade and material.

It is understood that the process described above is susceptible to various modifications, changes, and adaptions without departing from the scope of the invention as set forth in the appended claims.

What I claim is:

1. A wood-turning process for manufacturing cylindroconical rings for use as components of cylindroconical wood products comprising:

a. Starting with
   i. a generally circular disc of wood material axially affixed to an end of a rotatable shaft defining a shaft side of said disc and a nonshaft side;
   ii. drive means causing said shaft to rotate at a speed such that the outer edge of said disc travels at a speed of less than 26,000 inches per minute;
   iii. frame means on which said drive means and rotatable shaft are mounted;
   iv. a shaft-side wood-cutting bit and a nonshaft-side wood-cutting bit mounted in a bit-holding guide means with tooth ends of said bits directed toward each other, said ends being displaced from each other a distance greater than one and one-half times the thickness of said discs;
   v. swivel means and first locking means for fixable adjustment of the angle between said bits and the plane of said rotating disc, said swivel means and first locking means mounted on a table means;
   vi. table guide means and second locking means for fixable adjustment of the position of said table means and said bits along a radius of said rotating disc of wood material, said table means, table guide means and second locking means mounted on said frame means;
   vii. bit-moving means attached to said bit-holding-guide means and said swivel means for the purpose of directing cutting movement of each of said bits through substantially one-half of the thickness of said rotating disc; and
   viii. release means for removing said bit-moving means from attachment to said bit-holding-guide means;

b. using said swivel means to set a desired cylindroconical angle between said bits and said rotating disc plane;

c. actuating said first locking means;

d. using said table guide means to position said bits to cut an outer cylindroconical surface of a first ring;

e. actuating said second locking means;

f. actuating said bit-moving means to cause bit-holding-guide means to direct said non-shaft-side bit to cut, on the non-shaft-side of said disc, a cylindroconical channel of depth approximately equal to one half of the thickness of said disc;

g. actuating said release means and causing said non-shaft-side bit to return to a position of no-contact with said disc;

h. de-actuating said release means and actuating said bit-moving means to cause said shaft-side bit to cut, on the shaft-side of said disc, a cylindroconical channel of depth sufficient to connect with previously cut cylindroconical channel;

i. actuating said release means and causing said shaft-side bit to return to a position of no-contact with said disc;

j. releasing said second locking means;

k. using said table guide means to position said bits to cut an inner cylindroconical surface of said first ring simultaneously with an outer cylindroconical surface of a second ring;

l. actuating said second locking means;

m. repeating steps (f) through (j);

n. using said table guide means to position said bits to cut an inner cylindroconical surface of said second ring;

o. actuating said second locking means; and p. repeating steps (f) through (j).

2. The process of claim 1 in which said wood material is plywood.

3. The process of claim 1 in which a step (j) includes releasing said first locking means, using said swivel means to set a second cylindroconical angle and actuating said first locking means.

4. The process of claim 1 in which the position of step (k) is chosen such that the outer cylindroconical surfaces of said first and second rings form a continuous cylindroconical surface when said rings are stacked in proper relationship to each other.

5. The process of claim 1 in which each of said bits has a triangular-shaped tooth end with beveled edges.

6. The process of claim 1 in which more than two cylindroconical rings are formed.

*7. Apparatus for turning cylindroconical rings from wood blanks comprising:*

*frame means;*

*wood blank holding means mounted on said frame means, said holding means rotatable at a selected speed of rotation;*

*table means mounted on said frame means and adapted to be slidably movable with respect to said frame means in a direction parallel to a wood blank held by said wood blank holding means;*

*a pair of wood cutting bits;*

*bit holding means for holding said pair of wood cutting bits in a horizontally opposed position with the cutting edges of said bits spaced by distance greater than the thickness of the wood blank to be turned;*

*adjustment means attached to said table means for supporting said bit holding means, said adjustment means adapted to adjust the angle of said bits with respect to the plane of the wood blank to be turned;*

*bit moving means for selectably moving each of said cutting bits horizontally and so as to cause said cutting edges to engage a face of the wood blank to be turned;*

*drive means for rotating said wood blank holding means;*

*and at least one movable template attachable to said frame means and having a series of spaced locking notches to permit accurate positioning of said table means during each turning operation.*

*8. The apparatus as defined in claim 7 in which said drive means rotates the wood blank to be turned at rotational speeds in the range of 800 to 1,000 rpm.*

*9. The apparatus as defined in claim 7 in which said table means includes table guides and first locking means for locking said table means with respect to said frame means at selected positions during each turning operation.*

*10. The apparatus as defined in claim 7 in which said bit holding means comprises a generally U-shaped block with said cutting edges of said bits directed toward each other from the inner sides of said blocks.*

*11. The apparatus as defined in claim 7 in which said adjustment means includes a swivel means rotatably mounted on said table means and a second locking means for locking said swivel means at a selected angle.*

*12. The apparatus as defined in claim 7 in which the thickness of said wood cutting bits is approximately one fifteenth the thickness of the wood blanks to be turned.*

*13. The method of turning cylindroconical rings from wood blanks for use as components of cylindroconical wood products comprising the steps of:*

*a. attaching a wood blank to a rotatable shaft;*

*b. rotating the shaft at a selected cutting speed;*

*c. disposing a pair of horizontally opposed wood cutting bits having the tooth ends spaced greater than the thickness of the wood blank and with the wood blank between but not in contact with the pair of bits;*

*d. adjusting the angle between the plane of the pair of bits and the plane of the wood blank to a desired cylindroconical angle;*

*e. adjusting the positions of the pair of bits relative to the axis of the rotatable shaft to cut the outer cylindroconical surface of the first ring;*

*f. moving the pair of bits in a first direction to cause one of the bits to cut into one face of the wood blank to a depth approximately equal to one half the thickness of the blank;*

*g. moving the pair of bits in a second direction to cause the other of the bits to cut into the opposite face of the wood blank to a depth sufficient to connect with the cut made in step f above;*

*h. moving the pair of bits to the position defined in step c above;*

*i. adjusting the position of the pair of bits relative to the axis of the rotatable shaft to cut the inner cylindroconcial surface of the first ring simultaneously with the outer cylindroconical surface of a second ring; and*

*j. repeating steps f through i until a desired number of cylindroconical rings has been produced.*

* * * * *